United States Patent Office 3,098,004
Patented July 16, 1963

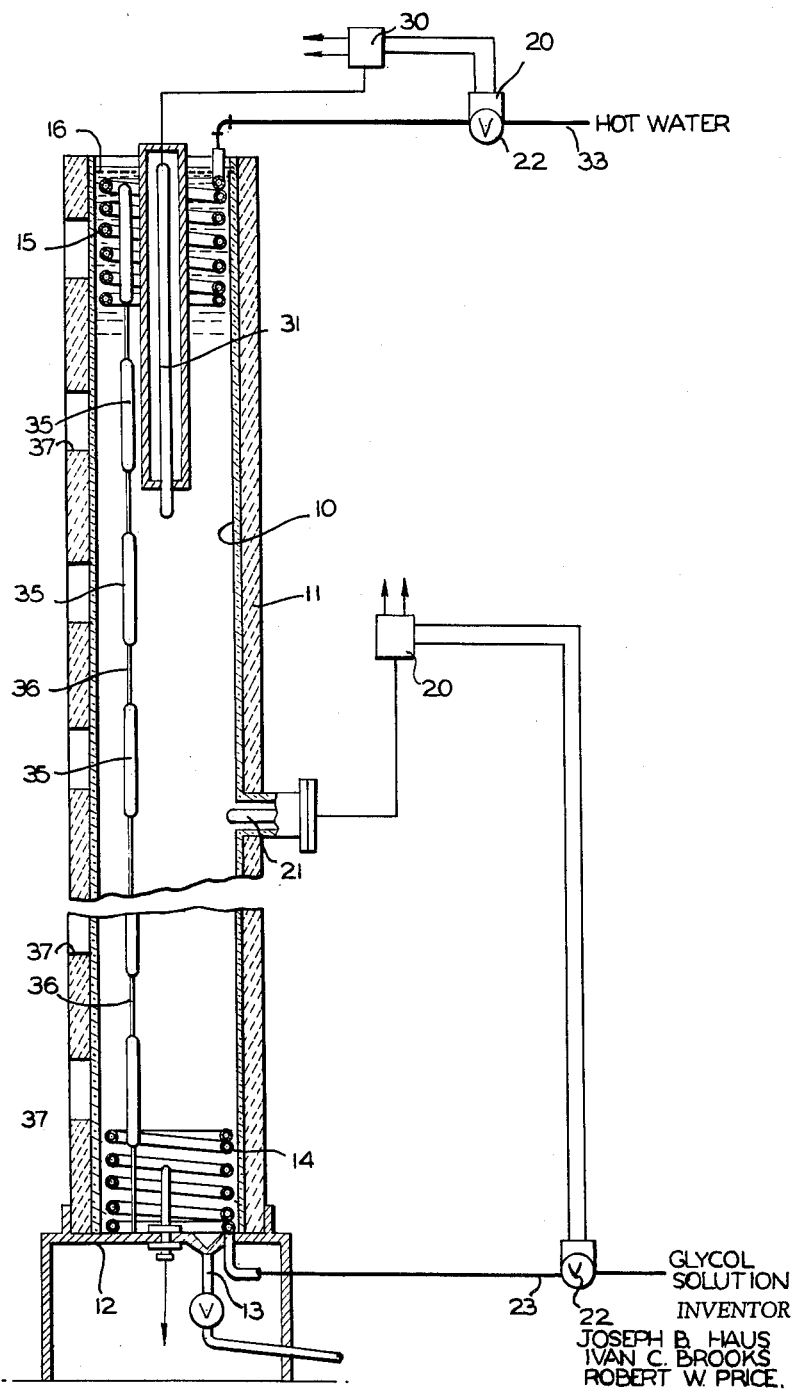

3,098,004
THERMOCLINE PENETRATING EMULSIFIABLE FISH TOXICANT COMPOSITIONS
Joseph B. Haus, Clifton, and Ivan C. Brooks, Bloomfield, N.J., and Robert W. Price, Pearl River, N.Y., assignors to S. B. Penick & Company, New York, N.Y., a corporation of Delaware
Filed Jan. 3, 1961, Ser. No. 80,304
8 Claims. (Cl. 167—46)

This invention relates to fish toxicant compositions and the method for using same. More particularly, this invention relates to modified fish toxicants based on emulsifiable compositions which can disperse through the thermocline, that exists in lakes, to kill the fish.

Fish toxicants are useful in reclaiming bodies of water such as lakes, streams and reservoirs to fishing, to reduce fish-induced turbidity, and to permit the regrowth of aquatic vegetation for water fowl feeding in areas where it has been reduced by bottom-rooting fish.

Game fishing falls off in many likes to which the public has had access for several years due to the imbalance of the fish population wrought by the use of special baits and lures. In reservoirs where close counts are made of the types of fish caught, such changes in the fish population become readily apparent. The rough fish remaining behind are free to multiply in the relative absence of the predatory game fish. Within five to ten years the off-balance of the fish population results in such disproportion that the game fish disappear entirely and even the rough fish become stunted through overcrowding.

Another nuisance exists in regions such as reservoirs where bottom feeding fish, carp and catfish, root out the aquatic plants. This causes a reduction of necessary food for the waterfowl which normally help control the fish population. Moreover, waterfowl is an important adjunct in the encouragement of the use of our natural wildlife resources by sportsmen.

The rooting habits of rough fish such as carp also causes turbidity in reservoir waters. Such turbidity may render the water unpalatable or at least unappetizing to the consumer.

Under such conditions it is best to eliminate all the fish in a body of water and then to selectively restock it with desirable species such as game fish. The usual procedure is to apply the fish toxicant to the water, harvest the dead fish, let the body of water detoxify and lie fallow and then to restock with the proper species.

During the fallow period the fish-food organisms recover and flourish. When the new species are introduced, the abundance of food and the absence of competing species permits the rapid adaptation to the new surroundings by the game fish. After a year, excellent fishing conditions may be expected and the waterfowl will resume normal feeding. Of course the turbidity conditions, where they exist, are corrected immediately on the removal of the offending bottom-feeding fish.

Fish toxicants used for such purposes consist primarily of emulsions or powders containing rotenone, toxophene, strobane or related derivatives. Rotenone can be used in purified form or in the form of extracts of the total toxic principles from rotenoid-containing plants such as cube, derris, timbo and similar woods. For the purposes of this invention no distinction is made between rotenone and the related rotenoids. They are all included by the term rotenone. Such materials are described in the Encyclopendia of Chemical Technology (vol. 7, p. 889) 1951.

Toxophene is a mixture of bicyclic chlorinated hydrocarbons, primarily chlorinated camphenes and is described in the Merck Index p. 1055 (7th edition). Strobane, also described on p. 983 of the Merck Index, is a mixture of chlorinated terpenes. Related to these latter compounds is 1,2,3,4,7,7-hexachlorobicyclo-2,2,1-heptane-2,6-hydroxymethylenesulfite described as a fish toxicant in the published German patent specification #1,089,207 dated September 15, 1960.

Rotenone is the preferred compound since in contrast to the other compounds it is relatively non-toxic to warm-blooded animals in piscicidal concentrations. Other compounds which are fish toxicants but not preferred are chlordane, DDT, dieldrin, etc.

It has been found that certain additives effectively synergize the toxicity of rotenone. Among the synergists for rotenone are isome, sulfoxide and piperonyl butoxide. These synergists, all substituted 3,4-methylenedioxyphenyls, have the general formula:

where $R_{ab}$ in the case of isome is:

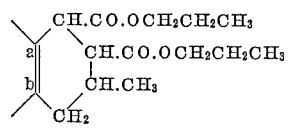

where $R_a$ in the case of sulfoxide is:

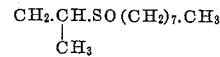

and in the case of piperonyl butoxide $R_a$ is: $CH_2.CH_2.CH_3$ and $R_b$ is: $CH_2.O.CH_2.CH_2O.CH_2.CH_2.O.C_4H_9$.

These compounds are the most active synergists for rotenone as a fish toxicant, but other compounds possessing the 3,4, methylenedioxyphenyl group are also synergistic.

Each of the above toxicants is sparsely soluble in water and is preferably applied by means of an emulsion or dispersion. Emulsification permits rapid dispersion of the toxicants throughout the water being treated. It should be noted that these compounds are effectively toxic to fish when dispersed in water, in concentrations of less than one part per million of the toxicant.

For purposes of assuring the emulsification and dispersion of the toxicants throughout the body of water being treated they are dissolved in nonaqueous solvents and the solvents are then emulsified. Nonionic and anionic surfactants are preferred for preparing these emulsions. These emulsions are applied directly to the surface of the water by spraying, or the emulsions may be adsorbed on the surface of wettable powders and the powders dusted onto the surface of the lake.

It has been noted that complete fish kills with toxicants were achieved only during the winer season, (including late fall and early spring). During the other periods of the year, it was noted that kills of the bottom-fish were less than complete. Examination of the physical conditions existing during the less successful seasons indicated that the thermal stratification which then exists in the lakes prevents the proper distribution of the toxicants.

It has been observed that large bodies of water, such as lakes, between late spring and late fall undergo thermal stratification into an epilimnion layer near the surface and a hypolimnion layer near the bottom. Between these two layers is the region known as the thermocline. The waters between the epilimnion and hypolimnion layers do not mix and the thermocline region is the quiescent region between these layers. The thermocline acts a barrier to prevent the mixing of waters. The thermocline region is defined by the steep temperature gradient that is set up between the independent convections of the warm epilimnion and the cold hypolimnion.

The need for a standard practice of designating the thermocline and the eplimnion and hypolimnion has led to the formulation of the following rule which is widely followed. The essential feature of this rule is that where the fall in temperature with increasing depth from the surface is less than 1° C. per meter, that position is still within the epilimnion; but where the temperature decline becomes 1° C. or more per meter of depth that circumstance marks the upper limit of the thermocline; and finally, the lower limit of the thermocline is similarly defined but in the reverse order, i.e., where the drop in temperature with increasing depth first becomes less than 1° C. per meter.

The transition from thermocline to hypolimnion is more gradual than that from the epilimnion to the thermocline and the layers while they exist physically have their boundries more or less arbitrarily defined.

It has been observed that when fish toxicants in emulsifiable form are introduced into the water these toxicants sink very slowly to the region of the thermocline but for some physical or physico-chemical reasons will not sink through this region into the hypolimnion where the bottom fishes, i.e., carp and catfish, feed.

An object of this invention is the modification of emulsifiable compositions to permit their complete dispersion through thermally-stratified bodies of water.

Another object of this invention is the modification of emulsions to permit dispersion through the thermocline regions of the lake.

Another object of this invention is to provide fish-toxicant compositions that permit complete eradication of all the fish in lakes during all seasons of the year.

A further object of this invention is the provision for fish-toxicant compositions that will assure complete eradication of bottom-rooting fish.

The above and further objects of this invention are achieved by the addition to the emulsifiable formulation of organic acids that are difficultly soluble in water and soluble at least to the extent of 1% in the non-aqueous phase of the emulsion or emulsifiable composition. These acids must of course be compatible with the other components of the emulsion.

The emulsifiable compositions for fish toxicant purposes consist of the toxicant dissolved in a water-immiscible organic solvent for the toxicant and to which has been added emulsifying agents and a thermocline penetrant to yield an emulsifiable mixture which will penetrate the thermocline.

The thermocline penetrants of this invention is the class of acidic substances which are soluble in the organic water-immiscible solvents for the fish toxicant and which are relatively insoluble in water. To effectively achieve the purposes of this invention the acidic substances need dissolve in the water only to the extent of creating a slightly acid condition at the interface between the aqueous and non aqueous phases. It should preferably be less soluble in water than in the solvent or it will leach out of the emulsion into the water before the emulsion reaches the thermocline.

Among the acidic substances which are effective and are useful for incorporation into the emulsions to enhance penetration of the thermocline are those acids that are soluble at least to the extent of 1% in the water-immiscible organic solvent system of the emulsion and which have a water solubility of less than 1%. The acidic substance should be sufficiently soluble in the water to have dissociation constant therein greater than $K=10^{-6}$. Among the aliphatic acids maleic, malonic, malic fumaric, adipic, succinic, pimilic and sebacic acids are effective. Among the aromatic acids meeting the conditions set forth above and effective are benzoic, salicylic, toluic phthalic, and cinnamic acids. The anhydrides of these acids, chlorinated acids and acid chlorides which fulfill the solubility requirements set forth are similarly useful.

It should be noted that the ingredients are used for large bodies of water and while the ultimate concentrations used are small, the total amounts used for a lake or reservoir are sizeable and that economically the cost of each ingredient is a very important factor since tons of the fish-toxicant mixture may be used.

Suitable nonaqueous solvents for the toxicants are organic solvents having densities approximating that of water or are slightly heavier than water. Particularly suitable solvents are the aromatic hydrocarbons including particularly the methylated naphthalenes. Among suitable solvents, commercially available are the Velsicols: AR50G; AR55; AR60; all manufactured by the Velsicol Chemical Company and the Panasols of the AN series sold by the Sharples division of the Pennsylvania Salt Company.

Other less-preferred solvents for the toxicants are the chlorinated hydrocarbons. However, due to the inherent mammalian toxicity of such chlorinated hydrocarbons and the extremely long time required for the detoxification of lakes following the use of such solvents, it is preferred to use these only in minimal amounts and to extend them, when used, with the aforementioned aromatic solvents for the toxicants.

Among the emulsifiers, surfactants of the nonionic and anionic type are suitable for use in these emulsions. Commercially available nonionic surfactants include Triton-X-100; and Atlas 1045a. Surfactants of the anionic type include Atlox 3335; Triton-X-160; Mal 20A and the like. In general it is best to use a single surfactant in a formulation but on occasion it has been useful to blend several of the materials to insure complete dispersion at the proper dilution.

The density of the final mixture of toxicants, synergists, solvents, emulsifiers and thermocline penetrants should be adjusted to the range 0.96 to 1.05 so that the emulsified non-aqueous phase disperses satisfactorily on the surface of the lake and then settles slowly through the epilimnion, the thermocline and the hypolimnion. The dispersal and settling rates can be controlled by adjustment of the densities of the solvent mixtures.

When very rapid settling of the toxicants is desired, the emulsion-density can be raised above 1.05 but special equipment for application of such compositions will then be required to assure proper horizontal distribution. Heavy or high density compositions are preferably emulsifiable liquid mixtures absorbed on heavy, dispersable powders such as diatomaceous earths, clays, etc., and these wettable powders are then dusted over the surface of the lake being treated and allowed to sink slowly and release the emulsion into the water.

The compositions of this invention comprise the toxicant, with or without synergists, the emulsifiers, the acidic thermocline-penetrants, the organic solvent and an emulsion carrier which may be water or the aforementioned dusts. These components are preferably prepared in the form of a concentrate which may be premixed with water. The concentration of the components in the concentrate is adjusted to yield, in the lake, a minimum concentration of at least twice the $LD_{50}$ of the toxicant. In the case of rotenone approximately 0.01 p.p.m. of synergized rotenone is required for efficient fish-toxicant purposes.

Typical thermocline penetrating formulations are set forth in Table I.

*Apparatus.*—For experimental purposes a water column set up to simulate thermocline conditions was prepared according to FIGURE 1. The column consisted of a vertically disposed glass tube 10 more than 9 feet in height and having an internal diameter of 10 inches. The column was protected with thermal insulation 11 and closed at the bottom with a steel plate 12 supporting a drain 13 and an internal stainless steel cooling coil 14. The top was open and a stainless steel heating coil 15 was mounted within the column just below the surface of the water 16.

The temperature of the lower part of the column was set and controlled by controller 20 with its sensory element 21 mounted above the bottom of the column. Circulating coolant from an external source 23 was admitted into coil 14 by valve 22 on demand from controller 20.

The temperature of the upper part of the column 10 is set and controlled by a controller 30 with its sensory element 31 located near the top of column 10. Circulating hot water from an external source 33 was admitted into coil 15 by valve 32 on demand from controller 30. The temperature at different parts of the column is determined by thermometers 35 mounted at intervals on vertical rod 36. The thermometers were read through corresponding holes 37 in insulation 11.

*Operation.*—The column was filled with water and the circulating systems were turned on for warming the top of the column and cooling the bottom. A period of 12 to 20 hours was generally sufficient to achieve equilibrium conditions. Depending on the temperature differential between the controllers at equilibrium, it was possible to establish a simulated thermocline somewhere between the top and the bottom of the column. The exact location of the thermocline was determined by the thermostat settings and the ambient temperature. It was found that a constant temperature gradient through the length of the column would not exist at equilibrium. Presumably because of convection currents, strata equivalent to an epilimnion at the top, a hypolimnion at the bottom and aquiescent intervening thermocline were developed.

The simulated thermocline that was developed in this apparatus at equilibrium was so stable that when sodium fluorescein was introduced above the thermocline + the dye could be seen distributing itself through the water above the thermocline but not going through it even after 48 hours. In another test, when the +dye was introduced into the bottom of the column it distributed itself in the volume below the thermocline but did not penetrate upward through it even after 48 hours.

The apparatus was tested with distilled water, tap water, and water from various lakes with pH conditions ranging from 4 to 9. The test emulsions were introduced into these waters after a stable simulated thermocline condition existed in the column and the dispersion was followed by chemical tests.

Using the above thermocline-simulating system, different emulsified formulations were introduced onto the surface of the water at concentrations destined to yield a final concentration of 1 p.p.m. of the composition. Water samples were periodically taken from the column at various levels. Each sample was colorimetrically assayed for components of the emulsion (rotenone), to check penetration of the thermocline.

The formulations of this invention have also been tested in lakes where thermal stratification exists. The following example is the report of such an in vivo experiment demonstrating the efficacy of the thermocline penetrant formulations according to this invention.

EXAMPLE

Milnor Lake in Montana was the subject. It has approximately 970 acre-feet of water, a surface area of approximately 30 acres and it has a maximum depth of 65 feet. During the period of the test, August, a thermocline was demonstrated to exist at the 20–25 foot level. The surface temperature of the water was 78° F. and the bottom temperature was 48° F. Fish, in cages were suspended at the thermocline level at the 40 foot level and at the bottom. The caged fish were observed by skin divers at 24, 48 and 72 hours after positioning and found to be normal and viable.

A formulation according to this invention (Formula B of Table I) was applied to the lake by helicopter in an amount calculated to give a concentration of 0.75 part per million of the formulation throughout the waters of the lake. Samples of the water taken at the end of 2 hours after completion of application showed that the formulation had not yet descended to the level of the thermocline. Inspection of the fish similarly showed them to be normal. During the fifth hour, samples showed a concentration of the formulation above the thermocline of 0.6 part per million. At the thermocline the concentration of the formulation was 0.7 part per million. At the 40 foot level the concentration was 0.6 part per million. None of the toxicant formulation had reached the bottom, at this time. Inspection of the caged fish during the fifth hour showed that those at the thermocline and at the forty foot level demonstrated typical rotenone-induced toxic symptoms. The fish at the bottom were normal. Twenty-seven hours after application samples showed a concentration of formulation at the thermocline and at the 40 foot level of 0.6 part per million. At the bottom the concentration was 0.8 part per million. The fish in all the cages were dead or dying. The surface of the lake showed the effectiveness of the toxicant. Several tons of floating, dead and dying, fish were removed from the surface of the lake. Two weeks after the initial application the formulation was reapplied at a concentration of 1 part per million. Only 100 lbs. of fish were left to be harvested. One month after the second application live caged fish were positioned at the 20 foot, 40 foot and 65 foot levels. After 72 hours at these levels the fish were inspected and found to be normal and viable indicating that the lake waters were detoxified.

It should be noted that emulsified formulations for penetrating the thermocline are not only useful as fish toxicants, but that the principle of using thermocline penetrants for dispersing nonaqueous materials in thermally stratified bodies of water will also serve to distribute other active chemicals. Among such other active chemicals which can be so dispersed there may be mentioned herbicides to control weeds which often choke lakes, fish hormones to control growth and propagation of fish, and insecticides or nematocides for the control of fish parasites in commercial fish farms. This invention broadly contemplates all such formulations for the introduction and distribution of active materials into thermally stratified bodies of water, and is not deemed to be limited to the specific examples set forth.

*Table I*

| | A | B | C | D | E | F | G | H | I | J |
|---|---|---|---|---|---|---|---|---|---|---|
| Rotenone | 5.0 | 2.5 | | | 5.0 | 2.5 | | | 5.0 | 2.5 |
| Other extractives (Rotenoids) | 10.0 | 5.0 | | | 10.0 | 5.0 | | | 10.0 | 5.0 |
| Toxaphone | | | 45.0 | | | | 60.0 | | | |
| Strobane | | | | 40.0 | | | | 42.0 | | |
| Velsicol AR-50 | 68.0 | 67.00 | | 53.0 | | 78.0 | | | 62.0 | |
| Panasol AN-2 | | | 48.0 | | 69.0 | | 23.0 | 46.0 | | 73.0 |
| Ethylene dichloride | | | | | 10.0 | | | | 10.00 | |
| Perchloroethylene | | 10.00 | | | | | | | | |
| Acetone | 10.0 | | | | | | | | 5.00 | 5.0 |
| Sulfoxide | | 2.50 | | | | 2.50 | | | | 2.5 |
| n-Propyl Isome | | | | | | | | | | |
| Triton-X-100 | 5.0 | | | | | | | 10.0 | | |
| Atlox 3335 | | | 5.0 | | | | | | | |
| Atlox 1045-A | | 10.00 | | | | | | | | |
| Emcol 300X | | | | 5.0 | | | | | | 10.0 |
| Toximul 600 | | | | | | 10.0 | 5.0 | | 5.0 | |
| Salicylic Acid | | | | | 8.0 | | 2.0 | | | |
| Sebacic Acid | | | | | | 2.0 | | | | |
| Benzoic Acid | | 3.00 | 2.0 | | | | | 2.0 | | |
| Adipic Acid | | | | | | | | | 3.0 | |
| Maleic Anhydride | 2.0 | | | 2.0 | 3.0 | | | | | 2.0 |

We claim:

1. A thermocline-traversing emulsifiable fish-toxicant composition, comprising a fish toxicant, a water-immiscible solvent for said fish toxicant, an emulsifier and an acidic thermocline-penetrant, soluble in said water-immiscible solvent and only slightly soluble in water.

2. The composition according to claim 1 wherein the acidic substance is chosen from the group consisting of fumaric acid, maleic acid, benzoic acid, salicylic acid, sebacic acid, phthalic acid, and phthalic anhydride.

3. A composition according to claim 1 having a density greater than 0.95.

4. A thermocline-traversing emulsifiable fish-toxicant composition, comprising a fish toxicant; a synergist therefor, a water-immiscible solvent for said fish toxicant and synergist; an emulsifier and an acidic thermocline-penetrant, soluble in said water-immiscible solvent and only slightly soluble in water.

5. A thermocline-traversing emulsifiable fish-toxicant composition, comprising rotenone, a water-immiscible solvent for said rotenone, an emulsifier, and an acidic thermocline-penetrant soluble in said water-immiscible solvent and only slightly soluble in water.

6. A thermocline-traversing emulsifiable fish-toxicant composition, comprising a fish toxicant chosen from the group consisting of rotenone and rotenoids, a synergist for rotenone, a water-immiscible solvent for said fish toxicant and synergist, an emulsifier, and an acidic thermocline-penetrant, soluble in said water-immiscible solvent and only slightly soluble in water.

7. A composition, according to claim 6 where the synergist is chosen from the group consisting of the N-octyl sulfoxide of isosafrol (sulfoxide); di-n-propyl-6,7 - methylenedioxy-3-methyl-1,2,3,4-tetrahydronaphthalene, 1,2-dicarboxylate (isome); and 3,4-methylenedioxy 6-propylbenzyl-(butyl)-diethylene glycol ether (piperonyl butoxide).

8. The method of eliminating fish in and below the thermocline existing in thermally-stratified bodies of water which comprises the application to such bodies of water, in a concentration at least twice the $LD_{50}$ to fish, of an emulsifiable fish-toxicant composition containing a fish toxicant, and an acidic substance, soluble in the non-aqueous phase of said emulsifiable composition, and slightly soluble in water.

References Cited in the file of this patent

UNITED STATES PATENTS

| | | |
|---|---|---|
| 2,663,191 | Brown | Dec. 22, 1953 |
| 2,816,442 | Burton | Dec. 17, 1957 |
| 2,884,356 | Starr et al. | Apr. 28, 1959 |

OTHER REFERENCES

The Canadian Fish Culturist, No. 8, October 1950, published by the Department of Fisheries, pages 22 and 27.